July 8, 1969  E. J. NIEDEK  3,454,124
MOTOR VEHICLE DRIP ABSORPTION DEVICE WITH DISPOSABLE ELEMENT
Filed Aug. 2, 1967
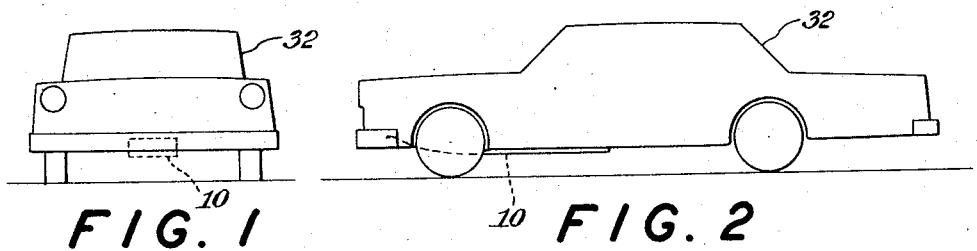
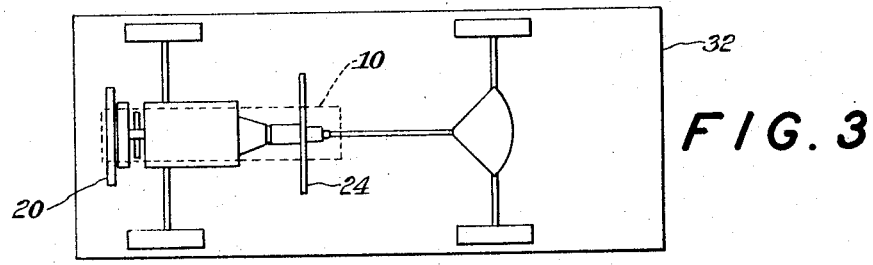
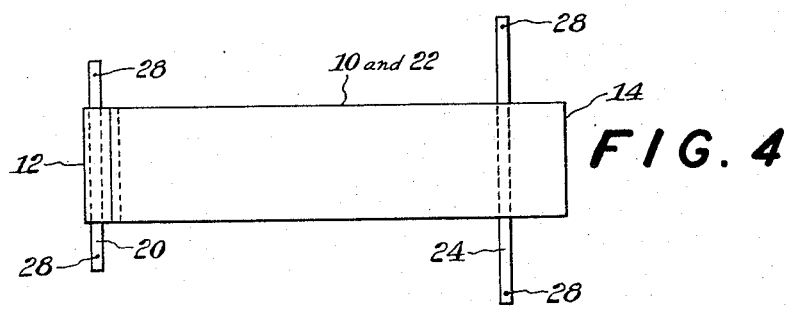
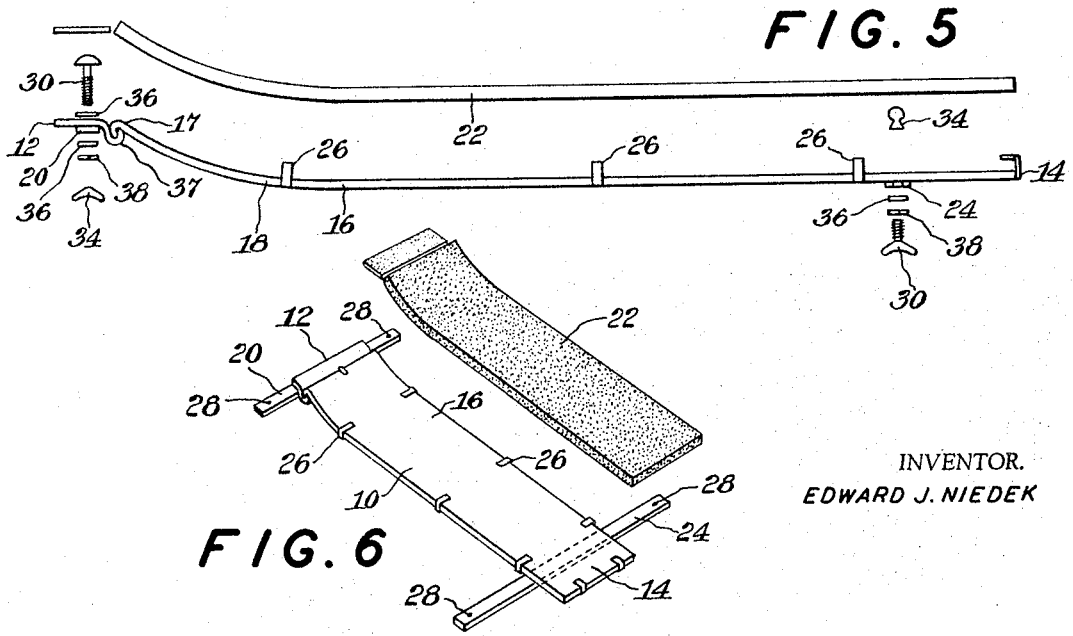
INVENTOR.
EDWARD J. NIEDEK

United States Patent Office 3,454,124
Patented July 8, 1969

3,454,124
MOTOR VEHICLE DRIP ABSORPTION DEVICE
WITH DISPOSABLE ELEMENT
Edward J. Niedek, 28953 James St.,
Warren, Mich. 48092
Filed Aug. 2, 1967, Ser. No. 657,861
Int. Cl. B62d 25/00
U.S. Cl. 180—69.1                              1 Claim

ABSTRACT OF THE DISCLOSURE

An elongated plate has means to attach the plate to the under side of a motor vehicle and a disposable pad of absorbent material for catching oil or other liquid substances which may drip from the vehicle is removably secured to the plate. The plate may be in two sections connected by a hinge formed of curved complementary elements.

---

This invention relates to automotive vehicles and has particular reference to a device for suspension beneath the vehicle to catch and collect all drippings from the vehicle engine, whereby to protect the garage floor, driveway and the like from such drippings.

An object of the invention is to provide an oil drip collector for a motor vehicle which may be used under all weather conditions.

Another object of the invention is to provide a device of the character indicated, which is constructed and arranged, particularly when attached to a low slung vehicle, so that it will slide smoothly over deep snow or sand, without damage to the device or the vehicle itself.

Another object of the invention is to provide a device of the character indicated, with attachment means whereby it may quickly and easily be fixed to the vehicle and may readily be lowered out of the way for servicing the vehicle.

Another object of the invention is to provide a device of the character indicated, with means for securing the disposable element, so that the element may be removed and replaced without dismantling the device or removing its principal parts from the vehicle.

I am aware that others have worked in this field, but the devices heretofore known to the public have left much to be desired. Previously known devices will not perform the functions intended of applicant's device.

It is therefore, an object of this invention to generally improve such devices and to provide a device which is simple in construction, economical to manufacture and install, and one in which the absorbent element readily may be removed and replaced without the use of tools.

The foregoing and other objects and advantages of the invention will become more apparent as the description proceeds, reference being made from time to time to the accompanying drawing, forming part of the within disclosure, in which drawing:

FIG. 1 is a front elevational view of a vehicle equipped with my device.

FIG. 2 is a side elevational view of the vehicle shown in FIG. 1.

FIG. 3 is a bottom plan view of the vehicle shown in FIGS. 1 and 2.

FIG. 4 is an enlarged top plan view of the device.

FIG. 5 is an enlarged, exploded, side elevational view of the device embodying the invention.

FIG. 6 is a reduced, exploded, perspective view of the invention device.

Referring now more particularly to the drawing, it will be understood that in the embodiment herein disclosed, the reference character 10 indicates an elongated plate of metal, plastic or other suitable material having a hinged front end portion 12, a rear end 14, and an upwardly curved portion 18, which extends from the approximate point 16 to the plate joint 17. This curved portion 18 is provided so that the device may easily slide over deep snow or sand when in use, and so that such elements will not become lodged on the device during the forward movement of the vehicle to which it is attached. The curved portion 18 terminates at the front in a downwardly curved element 17, which serves as part of a hinge joint, the other element of which is the upwardly curved portion 37 of the end portion 12.

This hinge joint 17–37 makes it possible for the rear end of the plate 10 to move independently, vertically of the front portion 12 and vice versa, during the travel of the vehicle. It also provides quick detachment of the main portion of the plate 10 from the front portion 12 for servicing and the like.

An elongated bar 20 is secured by any suitable means to the underside of the portion 12 of the plate, and extends laterally thereof. A second elongated bar 24 is secured to the underside of the plate 10, near the end 14, and extends parallel to the bar 20. The bars 20 and 24 are provided with bores 28 for receiving bolts 30, by which the bars and the plate 10 may be secured to the frame, or body 32 of the vehicle below the engine. The bolts 30 are provided with conventional nuts 34 and washers 36, 38.

Overlying the plate 10 is a pad, or layer 22 of highly absorbent material, preferably non-inflammable and disposable, which is held in position by means of spaced apart clips 26, held by the plate 10. These clips may be permanently bent over the top of the pad 22, as shown in FIG. 6, or they may be of bendable material so that they may be bent and unbent at will. If permanently bent over, the pad 22 may be attached and removed by bending the pad longitudinally.

It is believed that the operation of the device is obvious from the foregoing description.

Having described my invention, what I claim and desire to secure by Letters Patent is:

1. Apparatus for catching and absorbing oil, gasoline, grease, water, battery acid and other drippings from the underside of a vehicle in the general area of the internal combustion engine powering same, said apparatus comprising, an elongated plate adapted to be detachably secured to said underside, and a layer of highly absorbent disposable material which is positioned between said plate and said underside, and detachably secured to said plate by bendable elements on said plate, said plate being formed of two sections, hinged together near the front by complementary curved elements.

References Cited

UNITED STATES PATENTS

| 917,926   | 4/1909 | Coffin   | 180—69.1 |
| 1,759,280 | 5/1930 | Romaniuk. |          |
| 2,783,848 | 3/1957 | Beskid   | 180—69.1 |
| 2,931,453 | 4/1960 | Inglese  | 180—69.1 |
| 3,316,995 | 5/1967 | Fay      | 180—69.1 |

BENJAMIN HERSH, *Primary Examiner.*

M. L. SMITH, *Assistant Examiner.*